Jan. 27, 1931.  A. F. MOYER  1,790,509
WEIGHING APPARATUS
Filed Dec. 10, 1926

Inventor
AMOS F. MOYER
By
ATTORNEYS

Patented Jan. 27, 1931

1,790,509

UNITED STATES PATENT OFFICE

AMOS F. MOYER, OF MINNEAPOLIS, MINNESOTA, ASSIGNOR TO THE NATIONAL AUTOMATIC MACHINES COMPANY, OF MINNEAPOLIS, MINNESOTA, A CORPORATION OF MINNESOTA

WEIGHING APPARATUS

Application filed December 10, 1926. Serial No. 153,873.

This invention relates generally to weighing apparatus, and particularly to improvements in weighing platform connections, including fulcra for the platform levers.

A greater object of the invention is to provide suspension and fulcra means in which virtually no wear takes place, and which, therefor, practically eliminates those inaccuracies in weighing, due to wear.

Other objects are to eliminate the use of knife-edge fulcra or pivots, usually employed in scales, and thus largely avoid the difficulties ordinarily met with in designing and manufacturing, to reduce production costs and produce a more accurate and longer-lived weighing instrumentality.

The objections to the use of knife-edge pivots as fulcra are many. For example, the material must be of the hardest. The knife-edges must be separately formed, and then accurately positioned and securely connected to base and levers. It is a common practice to place hardened steel knife-edges in properly spaced relation in the mold for the scale member to be formed, and to flow the metal around them, thus securing the knives by embedment or "chilling". This is an objectionable practice. The temper is drawn. Inaccurate placement and spacing of the knives is common. Shrinkage is wholly responsible for, or further increases the inaccuracy. Warpage also plays a part. Other methods of securing the knife edge in position are objectionable because of added cost of manufacture. Further, the suspension of the levers in the base, and the suspension of the platform upon the levers by means of the conventional looped members, permits lateral swaying of the platform and sufficient friction to dull the knife-edges. Inaccuracy in weighing is the final result.

In the present device all the disadvantages enumerated are voided, inasmuch as no knife-edges are used. Instead, flexible resilient metallic bands are employed, and these are used as suspending, connecting, and fulcra elements, for sustaining the entire load. These fulcra tapes are passed over guiding surfaces which are contractured to permit pivotal movement of the levers by or through resilient flexure of the tapes.

Features of the invention relate to the use and manner of suspendingly attaching the tapes in positional correspondence to the ordinary knife-edges or fulcra of the weighing apparatus, as well as to the provision of a curved surface and a guiding surface or abutment which engage the tape from opposite sides, preferably with the center of curvature of surfaces on one lever element substantially horizontally alined through a knife-edged pivot point of an extension thereon when said lever is at or within the range of its weighing action, preferably at the upper limit of said range, and with the tapes attached at points above the center of curvature of one element and below the point of contact of the other.

Other objects, features and advantages of the invention will be disclosed in the description of the drawings, forming a part of this application, and in said drawings.

Figure 1:
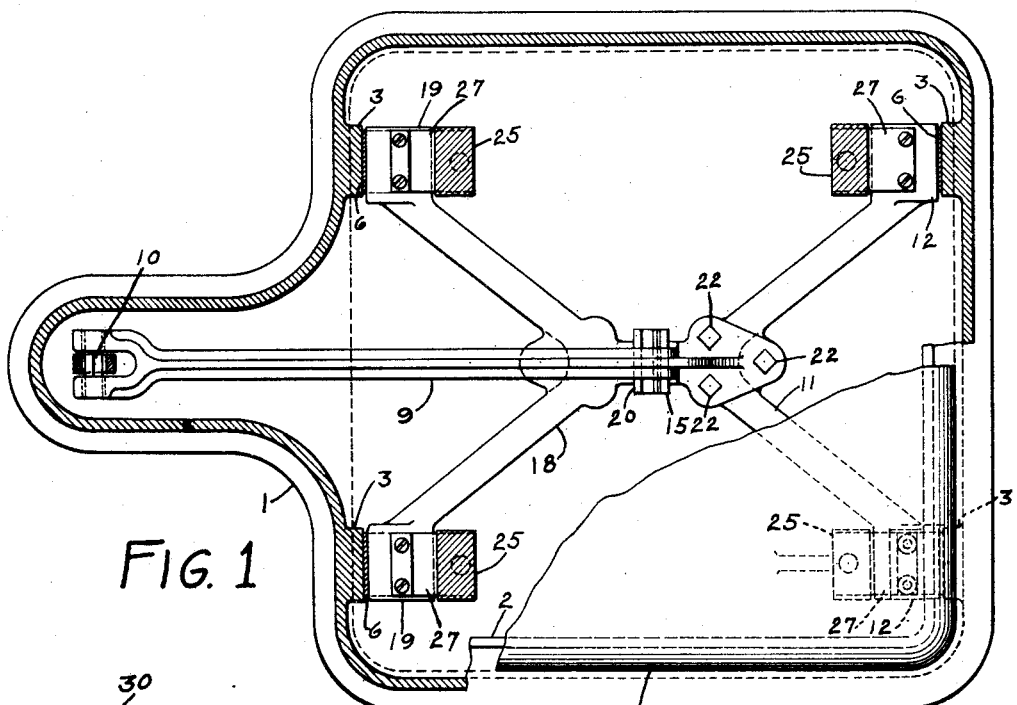
Figure 1 is a top plan view partly in section, showing an application of the invention for the suspension of the platform and associated levers of a conventional scale.
Figure 2:
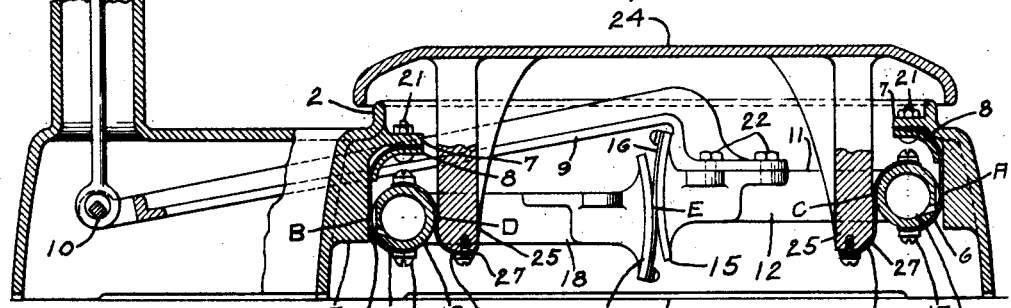
Figure 2 is a vertical longitudinal section with the main lever at its uppermost position.

The numeral 1 designates the base or frame of the scale, upon which all movable parts are supported. The opening or well has an upstanding peripheral flange 2. Vertical lugs 3 extend inwardly within the wall as shown. Four lugs as abutments, are employed, related as the corners of a rectangle, extending inwardly from opposite sides toward one another. The inner face of each lug provides an abutment surface 5, flatly against which a spring fulcrum and supporting tape 6 is engaged. Each fulcrum element is secured at the upper end, beneath the horizontal surface of a lug 7, and rests upon a downwardly, inwardly extending relatively rigid supporting clip 8. Through each clip, tape, and lug, a bolt 21 extends to secure all parts in operative position. At the lower end the clip secures the tape flatly against the abutment 5 in pendent position. In some instances, however, the connection of the tape against the abutment may be made without the use of the clip 8.

A main lever, in this case centrally disposed, comprising an elongated member 9, as a separate element, has a knife edge 10 at the outer end. This lever is attached as by bolts 22 to a lever element 11 comprising two arms each arm having a terminal hollow cylindrical element 12, which extends outwardly, the axes of the elements being transversely alined. These elements 12 extend beneath those lugs 7 farthest from the knife edge 10, and are connected with corresponding tapes or ribbons 6. Each ribbon engages and conforms to the curvature of its member 12, and is connected therebeneath by screws 13. Thus the tapes extend above and below the contacting points.

The tapes thus suspend the lever terminally for rolling contact with the abutments, and the lever can fulcrum or swing about the points A. In addition, the member 12 has formed therewith at an intermediate point a cylindrical segment 15 having its center of curvature in the axes of the elements 12. Attached to the segment 15 above the center of curvature and by one end, is a fulcrum ribbon 16 which extends downwardly, tangentially and engages against and around the similar segment of a short lever 18 of a configuration substantially the same as that of the element 15. This short lever 18 has hollow cylindrical laterally extending members 19, one terminally of each arm and axially alined transversely as in the case of the lever element 11. The frame has at its apex the cylindrical segmental member 20 above mentioned connected by a ribbon 16 as stated. All cylindrical and segmental surfaces of the system are parallel with the abutments, the axis of the cylindrical member of the short lever lying in a plane somewhat below that of the axes of the cylindrical members of the main lever. The members 19 are connected with respective tape 6 precisely in the manner described for those at the opposite side of the machine. Thus at the intermediate point, the segments are disposed against the opposite sides of the fulcrum ribbon 16, with the ribbon vertically tangential between the segments, as for all other paired elements now to be described.

The platform 24 has four depending legs 25, each providing at its outer side, a vertical abutment surface. To the bottom of each of these legs is secured a suspension tape element 27, and these suspension elements 27 connect with the top of each element 19 and pass therearound. The bottom of each leg 25 is curved from bottom upwardly, as shown at 28, the curved surface being a continuation of the abutment face of the leg. Similar attachments are made between the elements 11 and legs 25 at the opposite side.

The terminal members 11 and 19 have a thrust engagement with the faces of the vertical abutments, and roll there-against, and prevent undue swaying of the platform inasmuch as the guide legs 25 abuttingly engage the tapes which are supported by the elements 11 and 12 and which elements in turn abuttingly engage tapes 6 lying against the abutments 5. The lever 20 thus has a rolling motion on its flexible fulcrum at point A, while the frame 18 has a similar motion at points B. The segmental elements 15 and 20 have their fulcrum at the vertical tangent C. The outer or knife-edge end of the lever 9, is ordinarily suitably connected by a vertical member 30 with the weighing mechanism for the scales.

The points A, B, C, D and E positionally correspond to the pivot centers ordinarily used, and it is desirable that the tangent points for each lever be in a horizontal line, through the pivot point of the knife 10, in the case of the main lever.

Since each lever is limited to rolling motion by means of the above described abutments, on the base, co-active with guides 25 carried by the weighing platform and the associated ribbons, and since the segmental surface of each lever is concentric with the correspondingly rolling cylindrical element, a proper and equal proportioning of the segmental radius will permit the connecting ribbon 16 to freely assume a tangential position, substantially vertical. The vertical distances of the axis of cylindrical element 19 below the axis of the element 11 may be of any magnitude, providing the tangential portion of the ribbon is substantially vertically disposed. The slight difference in level or vertical displacement, as described, has the advantage that small inaccuracy in segmental curvature will not cause binding of the parts. Moreover the contacting abutments 5 and guides 25 co-active with ribbons 6 and 27 should be such as to permit a slight looseness of the contact as long as the suspending ribbon is substantially vertical. This slight looseness or play of the parts is required because eventually dust and foreign matter accumulates on the rolling surfaces.

Figures 3, 4, 5:
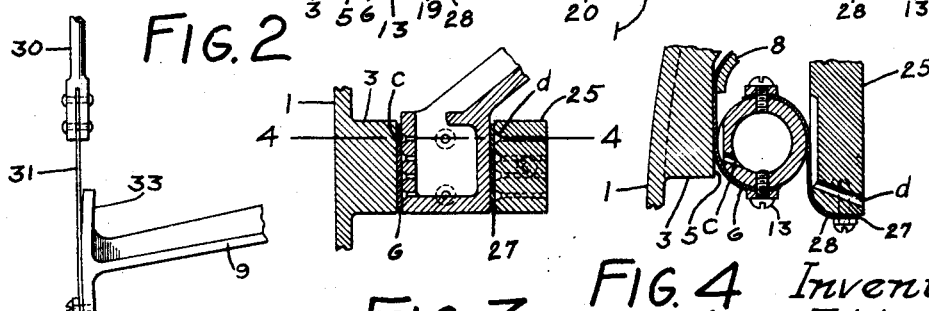
Figure 3 is a horizontal section showing means provided for disposing of the dust, to prevent accumulation of the same between the contacting surface of the ribbons and levers.
Figure 4 is a vertical section on line 4—4 of Figure 3.
Figure 5 illustrates a modified construction in which a suspension element is attached in place of a knife edge, as a connection between the main lever and weighing apparatus.

In those places which are most subject to the reception of dust, the construction shown in Figures 3 and 4 is used. It will be noted, in this instance, that those contacting surfaces which are most likely to receive dust from above are provided with a series of grooves, grooves being provided in the cylindrical members 11 and 19, and the grooves being provided in the legs or guides 25. These grooves connect at the bottom with discharge grooves respectively c—d which allow escape of the dust. These grooves pass downwardly and then at such an angle as to properly discharge the dust.

By having the tapes engaging around curved surfaces in the manner shown for the ribbons 6 and 27, the strain on the tapes is reduced, and, therefore, thinner tapes of greater flexibility can be used, which object could only be accomplished by special clamping means because the tapes extend directly vertically downwardly or upwardly from their fastening points. All tapes are thin and easily flexed making for ease of operation and for greater compensatory or distributive action at the suspension point. Thus the action is uniformly elastic, and there is no resistance to pivotal action other than hysteresis or loss of resilient energy in the tape material, within the elastic limit, which is smaller than in any mechanical form of pivot of equal load capacity. Rolling contact through a very small arc gives virtually a point of contact. All tapes are attached at points above and below the centers of curvature of their curved surfaces, and where subjected to the full load to be weighed, are herein shown connected laterally of their vertical portions, upon horizontal surfaces. It will be noted that the rolling cylindrical members are concentric for each lever, and lie at right angles to direction of extension of the levers. The suspension and fulcrum forming elements co-act or function, as thus used to obtain and maintain flexible suspension of the entire system between attachment points of the terminal suspension elements thereof.

In Figure 5 a flexible ribbon suspension is substituted for the conventional knife edge 10, which flexible suspending ribbon is indicated at 31, and is connected as by the rod 30 with a weighing mechanism of the scales. The lower end of the ribbon is attached as at 32 to the lower extremity of a segmental surface 33 on the main lever 9, similar to the attachment of ribbon 16 on the segment 20 of the short lever 18. If the curvature of the segment 33 is concentric with the axes of elements 11 or the lever 9, as is also the segment 15, then the desired condition of horizontal alinement of points, A, C, and D with the points of tangency corresponding to 10, will be automatically obtained for any position of the lever 9. This has an advantage when the weighing mechanism of the scale requires an appreciable range of action of angular movement, as in spring scales.

I claim as my invention:

1. A device of the class described comprising a base and a load carrying element providing vertical abutment surfaces, levers each having concentrically related curved surfaces and flexible tapes fastened to the base and load carrying element, and to the levers and lying between and contacting the abutment surfaces and curved surfaces, said tapes connecting the surfaces and extending above and below the points of contact.

2. A device of the class described comprising a base and a load carrying element providing flat abutment surfaces, levers each having concentrically related curved surfaces and flexible tapes fastened to the base and load carrying elements, and to the levers and lying between the abutment surfaces and curved surfaces, said tapes connecting the surfaces and extending above and below the points of contact, and substantially contacting said abutment and curved surfaces of said levers.

3. In a device of the class described, a support, a load carrying and proportioning lever having a cylindrical element, and a flexible tape extending below its center of curvature and secured to said element and arranged in vertical contact with said support between said element and support, and substantially contacting both.

4. In a weighing device, a pair of levers each having cylindrical elements, stationary opposed vertical abutting surfaces, flexible tapes between the elements each attached at one end to an abutting surface and at the other end to a cylindrical element, a load transmitting member with oppositely positioned vertical guide surfaces, and flexible elements as tapes between the surfaces of the load transmitting member and the guide surfaces.

5. A device of the class described including weighing instrumentalities, certain of which have curved surfaces and certain others of which have straight surfaces, certain of said curved and straight surfaces, being paired, and certain of said curved surfaces being also paired and flexible suspension elements disposed between and engaging the surfaces of the members of the pairs, and connecting thereto, above and below a line passing through the centers of curvature.

6. A device of the class described including a base, a weighing platform, and levers, all and each having curved portions adjacent their fulcrum and suspension points, with surfaces of base and platform paired at opposite sides, and the surfaces of levers paired at an intermediate point, and steel tapes pendantly attached to the base and connected to and against corresponding curved surfaces below the center of curvature, and tapes between each pair of curved surfaces, tangent thereto and each attached at opposite ends respectively above and below the center of curvature of the surfaces and engaging the surfaces over a substantial area.

7. In a device of the class described, a base providing vertical abutment surfaces, load carrying levers each having concentrically related curved surfaces, and flexible tapes fastened to the supports and load carrying elements and to the levers and lying between the abutment surfaces and the curved surfaces, said surfaces being spaced apart a distance substantially equal to the thickness of the tapes and said tapes being connected above and below the center of curvature of the curved surfaces.

8. A device of the class described comprising a base, a platform having lugs extending within the base and providing vertical abutment surfaces, said base having vertical abutment surfaces opposingly related to ends of the platform, levers having curved extensions lying between the opposing abutment surfaces with their axes perpendicular to the surfaces each lever further having a terminally curved surface said surfaces opposingly related and lying substantially midway between the first mentioned surfaces and flexible suspension elements respectively connecting the first mentioned surfaces at opposite sides of the projections with corresponding abutment surfaces, and an additional element connecting the last mentioned surfaces with all elements lying between and substantially abutting the opposing surfaces, and the connection of said elements being made at points above and below a line passing through the centers of curvature.

9. A scale base providing vertically arranged abutment surfaces, a weighing platform providing vertically arranged abutment surfaces opposingly related to the first mentioned surfaces, weighing levers providing curved surfaces interposed between the abutment surfaces, each lever having an additional curved surface concentric with the axis of curvature of its curved surfaces, and a tape disposed between each pair of opposing surfaces, the points of tangency of the tapes with the curved surfaces of each lever being in a horizontal plane, and each tape being connected at two points respectively to opposite adjacently disposed surfaces, at points above and below the point of tangency.

10. A scale base providing vertically arranged plane abutment surfaces, a weighing platform providing plane vertically arranged abutment surfaces opposingly related to the first mentioned surfaces, weighing levers providing curved surfaces interposed between the plane surfaces, each lever having an additional curved surface concentric with the axis of curvature of its curved surfaces, and a tape disposed between each pair of opposing surfaces, the points of tangency of the tapes with the curved surfaces of each lever being in a horizontal plane, and each tape being connected at two points respectively to opposite adjacently disposed surfaces, at points above and below the point of tangency.

11. A scale base having abutment surfaces, a platform having abutment surfaces opposed to the first mentioned surfaces, levers each having a cylindrical extension disposed between paired surfaces respectively of the base and platform, each lever having an additional curved surface concentric with the axis of its cylindrical extension, said surfaces opposingly related, and tapes arranged between paired surfaces and connected above and below the points of tangency of the tapes with the curved surfaces, and the points of tangency of the tapes with the curved surfaces of respective levers lying in a horizontal plane.

12. A scale base having vertical abutment surfaces, a platform having vertical abutment surfaces opposed to the first mentioned surfaces, levers each having a cylindrical extension disposed between paired surfaces respectively of the base and platform, each lever having an additional curved surface concentric with the axis of its cylindrical extension, said surfaces opposingly related, and tapes arranged between paired surfaces, and connected above and below the points of tangency of the tapes with the curved surfaces, the points of tangency of the tapes with the curved surfaces of respective levers lying in a horizontal plane, those tape elements disposed between the base abutments and the cylindrical elements being connected by their upper portions to the base and those disposed between the cylindrical elements and the platform abutments being connected by the upper portions to the cylindrical element, and the tape between the additional curved surfaces of the levers connecting them at points above and below the point of tangency of the tape with their curved surfaces.

13. A scale base having vertical abutment surfaces related as the corners of a rectangle, a platform having vertically disposed abutment surfaces similarly arranged and opposing the other abutments, a pair of levers each having a pair of cylindrical extensions respectively disposed between pairs of opposing abutments, each lever also having a curved surface concentric with the axis of curvature of its cylindrical extensions, said curved surfaces lying at the center of the rectangle, and a tape disposed between each of the oppositely related surfaces respectively of the levers, base and platform, the points of tangency of the tapes of respective levers and their curved surface lying in a horizontal plane, said tapes being attached at points above and below the point of tangency, respectively to opposing surfaces.

14. A scale base having abutment surfaces, a platform having abutment surfaces opposed to the first mentioned surfaces, levers each having an extension disposed between paired surfaces respectively of base and platform, the said extensions having curved surfaces opposing the surfaces of base and platform, each lever having an additional curved surface concentric with the axis of curvature of said curved surfaces, the last mentioned surfaces being opposingly related, and tapes arranged between the paired surfaces and connected above and below the point of tangency of the tapes with the curved surfaces, the tape of the additional lever surfaces being arranged midway between the other curved surfaces.

15. A device of the class described comprising a base, and a load-carrying element, each provided with an abutment, said abutments being opposingly related, an element having curved portions respectively opposed to an abutment, and flexible tapes attached to engage the curved portions, and connected to the abutments in a manner to lie between the curved portions and abutments.

16. A device of the class described comprising a base, and a load-carrying element, each provided with an abutment, said abutments being opposingly related, a lever having curved portions respectively opposed to an abutment, and flexible tapes attached to the lever and connected to the abutments in a manner to lie between the curved surfaces and abutments, said tapes being tangent to the curved surfaces and the points of tangency lying substantially in a horizontal plane, which plane is substantially perpendicular to the opposed abutment surfaces.

17. A device of the class described comprising a base and a load-carrying element having vertical abutment surfaces opposingly related, a lever having curved surfaces arranged between the abutment surfaces, flexible tapes respectively fastened to the base and load-carrying elements and to respective curved surfaces of the levers, each tape lying between an abutment surface and a lever surface, and said tapes being respectively extended above and below a line normal to direction of load movement and passing substantially through the centers of curvature of the lever surfaces.

In witness whereof, I have hereunto set my hand this 8th day of December, 1926.

AMOS F. MOYER.